US012799964B2

(12) United States Patent
Teramoto et al.

(10) Patent No.: US 12,799,964 B2
(45) Date of Patent: Nov. 17, 2026

(54) STAPLE AND DRIVING TOOL

(71) Applicant: MAKITA CORPORATION, Anjo (JP)

(72) Inventors: Makito Teramoto, Anjo (JP); Kiyonobu Yoshikane, Anjo (JP); Tatsuya Ikedo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/287,972

(22) Filed: Aug. 1, 2025

(65) Prior Publication Data

US 2026/0078789 A1 Mar. 19, 2026

(30) Foreign Application Priority Data

Sep. 19, 2024 (JP) ................................. 2024-161978

(51) Int. Cl.

| | |
|---|---|
| ***F16B 15/00*** | (2006.01) |
| ***B25C 5/13*** | (2006.01) |
| ***F16B 15/06*** | (2006.01) |
| ***F16B 15/08*** | (2006.01) |

(52) U.S. Cl.

CPC ............ *F16B 15/0015* (2013.01); *B25C 5/13* (2013.01); *F16B 15/0092* (2013.01); *F16B 15/06* (2013.01); *F16B 15/08* (2013.01)

(58) Field of Classification Search

CPC .... B25C 5/13; F16B 15/0015; F16B 15/0092; F16B 15/06; F16B 15/08; F16B 15/00; Y10S 411/92; Y10S 227/902

See application file for complete search history.

(56) References Cited

U.S. PATENT DOCUMENTS 275,435 A * 4/1883 Sweet ...................... A44B 1/44 411/475
662,587 A * 11/1900 Blake ........................ F16L 3/04 248/71
1,264,238 A * 4/1918 Whetstone ............ E04F 13/045 52/669
1,310,908 A * 7/1919 Gilbert ................ F16B 15/0015 411/920
1,311,903 A * 8/1919 Leschander ............. F16B 15/08 411/456
1,574,790 A * 3/1926 Carroll ................ H01M 50/256 294/158
1,639,530 A * 8/1927 Payson ............... F16B 15/0015 411/920
1,833,786 A * 11/1931 Maraguglio ........ F16B 15/0015 411/475
2,632,356 A * 3/1953 Thiel .................. F16B 15/0015 411/920
3,154,999 A * 11/1964 Stewart ................... F16B 15/02 411/920

(Continued)

FOREIGN PATENT DOCUMENTS

DE 1930490 A1 * 12/1970 ............... B25C 1/18

*Primary Examiner* — Shelley M Self
*Assistant Examiner* — David G Shutty
(74) *Attorney, Agent, or Firm* — Oliff PLC

(57) ABSTRACT

A staple has a pair of legs extending approximately parallel to each other. Base ends of the pair of legs are connected to a crown. The crown has a width greater than a separation distance between the pair of legs. The crown has a planar top surface facing away from the pair of legs.

13 Claims, 8 Drawing Sheets

(56) References Cited

U.S. PATENT DOCUMENTS

| | | | | | |
|---|---|---|---|---|---|
| 3,203,220 | A * | 8/1965 | Kaepernik | A61B 17/10 | 72/409.13 |
| 3,813,985 | A * | 6/1974 | Perkins | F16B 15/00 | 411/902 |
| 4,114,859 | A * | 9/1978 | Stenson | F16B 15/0015 | 256/48 |
| 4,697,045 | A * | 9/1987 | Beatty | F16B 15/06 | 411/456 |
| 5,053,038 | A * | 10/1991 | Sheehan | A61B 17/0642 | 606/75 |
| 5,366,479 | A * | 11/1994 | McGarry | A61B 17/0684 | 606/151 |
| 5,695,524 | A * | 12/1997 | Kelley | A61B 17/0644 | 411/457 |
| 5,941,890 | A * | 8/1999 | Voegele | A61B 90/39 | 606/220 |
| 6,071,053 | A * | 6/2000 | Kuhns | B25C 5/06 | 411/442 |
| 6,126,372 | A * | 10/2000 | Takata | F16B 15/0015 | 411/475 |
| 6,425,903 | B1 * | 7/2002 | Voegele | A61B 90/39 | 606/220 |
| 8,083,454 | B2 * | 12/2011 | Doole | F16B 15/0015 | 411/921 |
| 9,121,427 | B2 * | 9/2015 | Young | B25C 5/0257 | |
| 11,073,174 | B2 * | 7/2021 | Parker | F16B 15/0015 | |
| D988,856 | S * | 6/2023 | D'Ascanio | D8/390 | |
| 11,746,815 | B2 * | 9/2023 | Koper | F16B 15/0015 | 227/176.1 |
| 12,180,986 | B2 * | 12/2024 | Koper | F16B 15/0015 | |
| 2003/0021655 | A1 * | 1/2003 | Correll | F24D 3/143 | 411/473 |
| 2019/0337135 | A1 * | 11/2019 | Kargenian | B25C 1/006 | |
| 2023/0407900 | A1 * | 12/2023 | Koper | F16B 15/0015 | |
| 2025/0347306 | A1 * | 11/2025 | Carlsson | F16B 15/0015 | |
| 2026/0078789 | A1 * | 3/2026 | Teramoto | F16B 15/0015 | |

* cited by examiner

STAPLE AND DRIVING TOOL

CROSS-REFERENCE TO RELATED APPLICATION

This application claims priority to Japanese patent application serial number 2024-161978, filed on Sep. 19, 2024, the contents of which are incorporated herein by reference in their entirety for all purposes.

TECHNICAL FIELD

The present invention generally relates to a staple and a driving tool for driving the staple into a workpiece.

BACKGROUND

Typically, U-shaped staples attach components to various materials. A common example is a fencing staple that is used to secure metal wire fences to wooden posts. A driving tool's driver pushes the staple into the post. These staples usually have an arched crown and a pair of legs extending parallel from both ends of the crown. Traditionally, the driver's striking surface is a recessed curved shape to match the crown's curve. However, due to variations in the staple's crown shape, the driving force can be uneven across its width. This can cause the staple to tilt or be misaligned, leading driving failure.

Therefore, there is a need for staples that are less likely to tilt or become misaligned when driven into the workpiece.

SUMMARY OF THE DISCLOSURE

According to one aspect of the present disclosure, the staple has a pair of legs extending approximately parallel to each other. A base end of each of the pair of legs is connected to the crown. The crown has a width greater than a separation distance between the pair of legs in a width direction. The crown has a planar top surface formed in the crown, facing away from the pair of legs. Therefore, when the staple is driven by the driver of the driving tool, the staple is more likely to make surface-contact with the top surface of the crown. In other words, the staple is more likely to be driven flatly by the driver of the driving tool when it receives an impact on the top surface. Accordingly, the staple is more likely to receive an even and uniform driving force in the width direction. Thus, the staple is less likely to tilt or become misaligned when driven into the workpiece.

DETAILED DESCRIPTION

Figure 1:
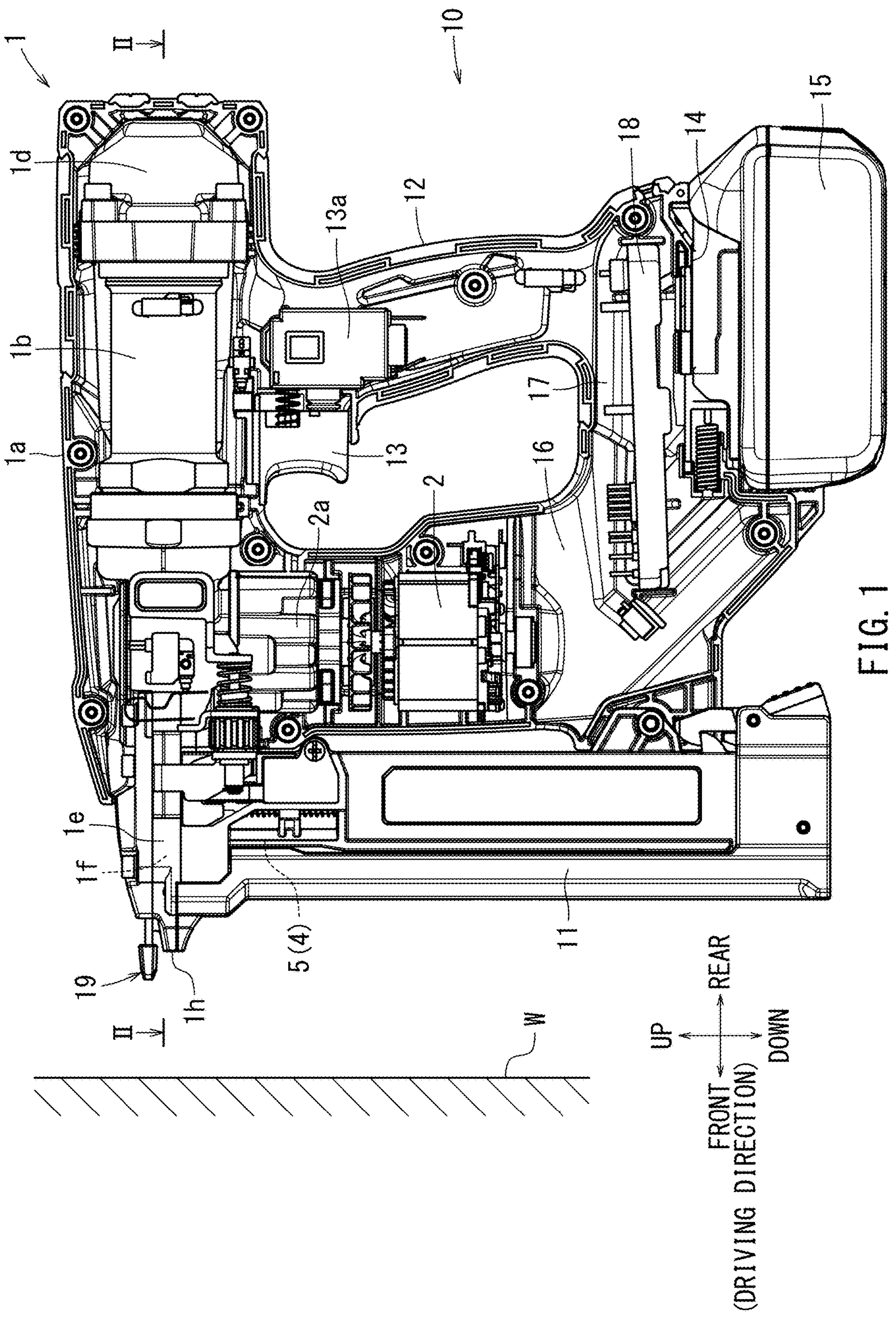
FIG. 1 is a left side view of a driving tool without a left housing according to a first embodiment of the present disclosure.

The detailed description set forth below, when considered with the appended drawings, is intended to be a description of exemplary embodiments of the present disclosure and is not intended to be restrictive and/or representative of the only embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the disclosure. It will be apparent to those skilled in the art that the exemplary embodiments of the disclosure may be practiced without these specific details. In some instances, these specific details refer to well-known structures, components, and/or devices that are shown in block diagram form in order to avoid obscuring significant aspects of the exemplary embodiments presented herein.

According to another aspect of the present disclosure, the pair of legs is formed with the barbs that protrude in opposite directions. That is, each of the pair of legs forms a barb that protrudes outwardly, such that each barb protrudes away from the other. The crown protrudes outwardly beyond the barbs in the width direction. Therefore, the barbs increase a pull-out load of the staple against the workpiece. The crown protrudes outwardly beyond the barbs in the width direction, and accordingly, the crown is easily guided by the driving passage in the width direction. Also, the barb is less likely to contact the driving passage. Furthermore, the crown is restricted from displacing in the width direction in an area relatively close to the top surface that is driven by the driver. Therefore, the staple is easily guided by the driving passage and is not easily displaced in the width direction According to another aspect of the present disclosure, the top surface is formed in the middle of the crown in the width direction. The width of the top surface is between one-sixth and two-thirds of the maximum width of the crown. Thus, the middle portion of the staple in the width direction is driven by the driver. Accordingly, a driving force is uniformly applied to the pair of legs in the width direction. Furthermore, the top surface has a certain width and length. Therefore, the staple is easily driven into the workpiece without tilting.

According to another aspect of the present disclosure, the crown includes a curved portion extending from the top surface and bulging in the width direction, and a diagonal portion extending straight from the curved portion toward a vicinity of a maximum width portion of the crown. Therefore, the driving force received by the top surface is likely transmitted to the diagonal portion without causing stress concentration, due to the curved portion. Because of this, the staple is less likely to be damaged.

According to another aspect of the present disclosure, the crown has a curved portion extending from the top surface and bulging in the width direction. The curved portion extends to the maximum width portion of the crown. Therefore, the driving force received by the top surface is likely transmitted to the maximum width portion without causing stress concentration, due to the curved portion. Because of this, the staple is less likely to be damaged.

According to another aspect of the present disclosure, the crown includes a planar guide surface that is positioned in the maximum width portion of the crown and faces outwardly in the width direction and extends in a direction in which the pair of legs extends. The guide surface extends in the direction in which the pair of legs extends. Thus, the guide surface faces against the driving passage. Therefore, the staple is guided over a large area by the guide surfaces. Thus, the staple is less likely to tilt when driven into the workpiece.

According to another aspect of the present disclosure, an adhesive is applied to the pair of legs to increase the resistance when being removed from the workpiece. Therefore, the driven staple is more difficult to remove from the workpiece.

According to another aspect of the present disclosure, the staple has a thickness of 15 gauge or greater. Thus, for example, the staple can be easily used as a fencing staple to fasten a metal wire between the staple and the workpiece.

According to another aspect of the present disclosure, the staple is provided in the form of collated staples with a plurality of staples. Therefore, the staple can be easily handled as the collated staples.

According to another aspect of the present disclosure, the driving tool drives the staple. A driver of the driving tool has a driving surface that is perpendicular to the driving direction so as to surface-contact the top surface of the staple. Therefore, the top surface of the staple is driven by the driving surface of the driver. The driver drives the staple uniformly in the width direction due to the surface-contact between the driving surface of the driver and the top surface of the staple. Thus, the staple is prevented from tilting when driven into the workpiece.

Next, a first embodiment of the present disclosure will be described with reference to FIGS. 1 to 6. As shown in FIG. 1, a driving tool 10 is a gas spring type driving tool that uses, for example, gas pressure for driving a staple 5. In the following description, a direction of driving the staple 5 is defined as a forward direction and a direction opposite to the driving direction is defined as a rearward direction. A user grasps the driving tool 10 with his or her hand and is positioned behind the driving tool 10 (on the rear side in FIG. 1). An up-down direction and a left-right direction are defined based on a position of the user.

Figure 2:
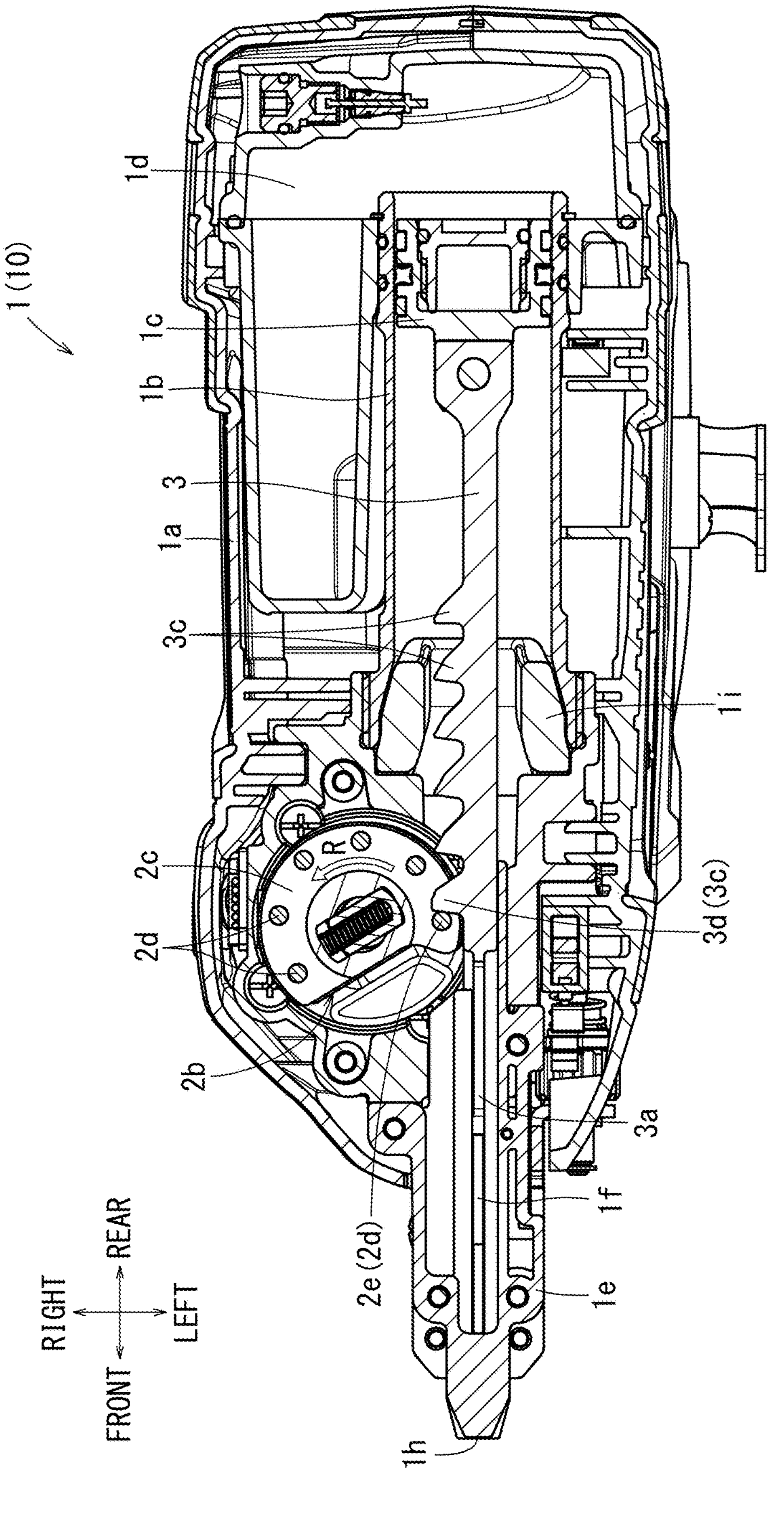
FIG. 2 is a cross-sectional view taken along line II-II of FIG. 1.

As shown in FIG. 1, the driving tool 10 has a tool main body 1. The tool main body 1 has a housing 1*a* that is tubular shaped. Inside the housing 1*a*, a cylindrical-shaped cylinder 1*b* extends in a front-rear direction. FIG. 2 shows a piston 1*c* housed within the cylinder 1*b* for reciprocal motion. A rear portion of the cylinder 1*b* behind the piston 1*c* is connected to the accumulation chamber 1*d*. The accumulation chamber 1*d* is filled with compression gas (like air), which provides the thrust to drive the piston 1*c* forward.

As shown in FIG. 1, a driving nose 1*e* is arranged in front of the cylinder 1*b*. A driving passage 1*f* is formed inside the driving nose 1*e*. A rear end of the driving passage 1*f* is connected to a front portion of the cylinder 1*b*. A magazine 11 is arranged on a side of the lower surface of the driving nose 1*e*. A plurality of staples 5 (collated staples 4) are housed in the magazine 11 in parallel in the up-down direction (refer to FIG. 3). The staples 5 are supplied one by one in the upward direction from within the magazine 11 toward the driving passage 1*f*.

As shown in FIG. 1, the driving nose 1*e* is provided with a contact arm 19 that is slidably movable in the front-rear direction. The contact arm 19 is biased so as to move in the forward direction relative to the driving nose 1*e* (off position). When pressed against the workpiece W, the contact arm 19 moves in the rearward direction relative to the driving nose 1*e* (on position).

As shown in FIG. 1, a grip 12, which the user grapes, is formed extending from a lower portion of the tool main body 1. A trigger 13, which is pull-operated by the user with a fingertip, is arranged on an upper front surface of the grip 12. A trigger switch 13*a* is arranged inside the grip 12. In accordance with a pull operation of the trigger 13, the trigger switch 13 is switched between an off state and an on state. When the contact arm 19 is pressed against the workpiece W and moves to the on position, the pull operation of the trigger 13 becomes effective.

As shown in FIG. 1, a battery attachment portion 14 is arranged on a lower surface of the grip 12 extending in the front-rear direction. A battery pack 15 can be removably attached to the battery attachment portion 14. The battery pack 15 can be attached to or detached from the battery attachment portion 14 by sliding the battery pack 15 in the front-rear direction. The battery pack 15 removed from the battery attachment portion 14 can be recharged by a dedicated charger for repeated use. The battery pack 15 can be used as a power source for other power tools. The battery pack 15 operates as a power source for supplying power to an electric motor 2 etc.

As shown in FIG. 1, a driving section case 16 formed in approximately a tubular shape is arranged in front of the grip 12 extending in the up-down direction. An upper portion of the driving section case 16 is integrally connected to the housing 1*a*. A connection section 17 is formed between the driving section case 16 and the battery attachment portion 14. The connection section 17 houses a controller 18. The controller 18 primarily controls driving of the electric motor 2.

As shown in FIG. 1, a motor 2, serving as a driving source, is housed inside the driving section case 16. The electric motor 2 is housed with its motor axis extending in the up-down direction. The electric motor 2 is powered from the battery pack 15 and activated by a pulling operation of the trigger 13. A reduction gear train 2*a* is arranged above the electric motor 2. Also, a lift mechanism 2*b* is arranged above the reduction gear train 2*a* (refer to FIG. 2). The electric motor 2, the reduction gear train 2*a*, and lift mechanism 2*b* are coaxially arranged. A rotational output of electric motor 2 is reduced by the reduction gear train 2*a* and output to the lift mechanism 2*b*.

As shown in FIG. 2, the lift mechanism 2*b* is positioned on the right side of the driving nose section 1*e*. The lift mechanism 2*b* has a rotatable wheel 2*c*. The wheel 2*c* rotates in a direction indicated by an arrow R (counterclockwise in FIG. 2). The wheel 2*c* is configured to be restricted from rotating in a direction opposite to the direction R. The wheel 2*c* has six engaging portions 2*d* which are arranged along an outer circumferential edge of wheel 2*c*. The engaging portions 2*d* are cylindrical-shaped shaft members (pins) extending in the up-down direction.

As shown in FIG. 2, an elongated driver 3 extending in the front-rear direction is coupled to a front surface of the piston 1*c*. A tip end 3*a* of the driver 3 enters the driving passage 1*f*. The driver 3 has six engaged portions 3*c*. Each of the engaged portions 3*c* protrudes rightward from a right side of the driver 3. Each engaged portion 3*c* is formed in the shape of rack teeth. The engaged portions 3*c* are arranged at regular intervals in the longitudinal direction of the driver 3 (in the front-rear direction). Each of the engaged portions 3*c* sequentially engages a corresponding engaging portion 2*d* of the lift mechanism 2*b*.

FIG. 2 shows that the driver 3 is at a standby position before a driving operation is performed. As shown in FIG. 2, an engaging portion 2*d* engages a corresponding engaged portion 3*c*. In more detail, a front-end rack 3*d*, which is the foremost engaged portion of the engaged portions 3*c*, engages a rear-end pin 2*e* (last engaging pin 2*e*) located at the rear end in the rotation direction of the wheel 2*c*. The last engaging pin 2*e* engages the front-end rack 3*d* from the front. Due to the engagement of the last engaging pin 2*e* with the front-end rack 3*d* and the rotational restriction of the wheel 2*c* in the direction opposite to the direction R, the lift mechanism 2*b* supports the driver 3 from the front. Accordingly, the driver 3 and the piston 1*c* are held at the standby position against the gas pressure in the accumulation chamber 1*d*.

Figure 3:
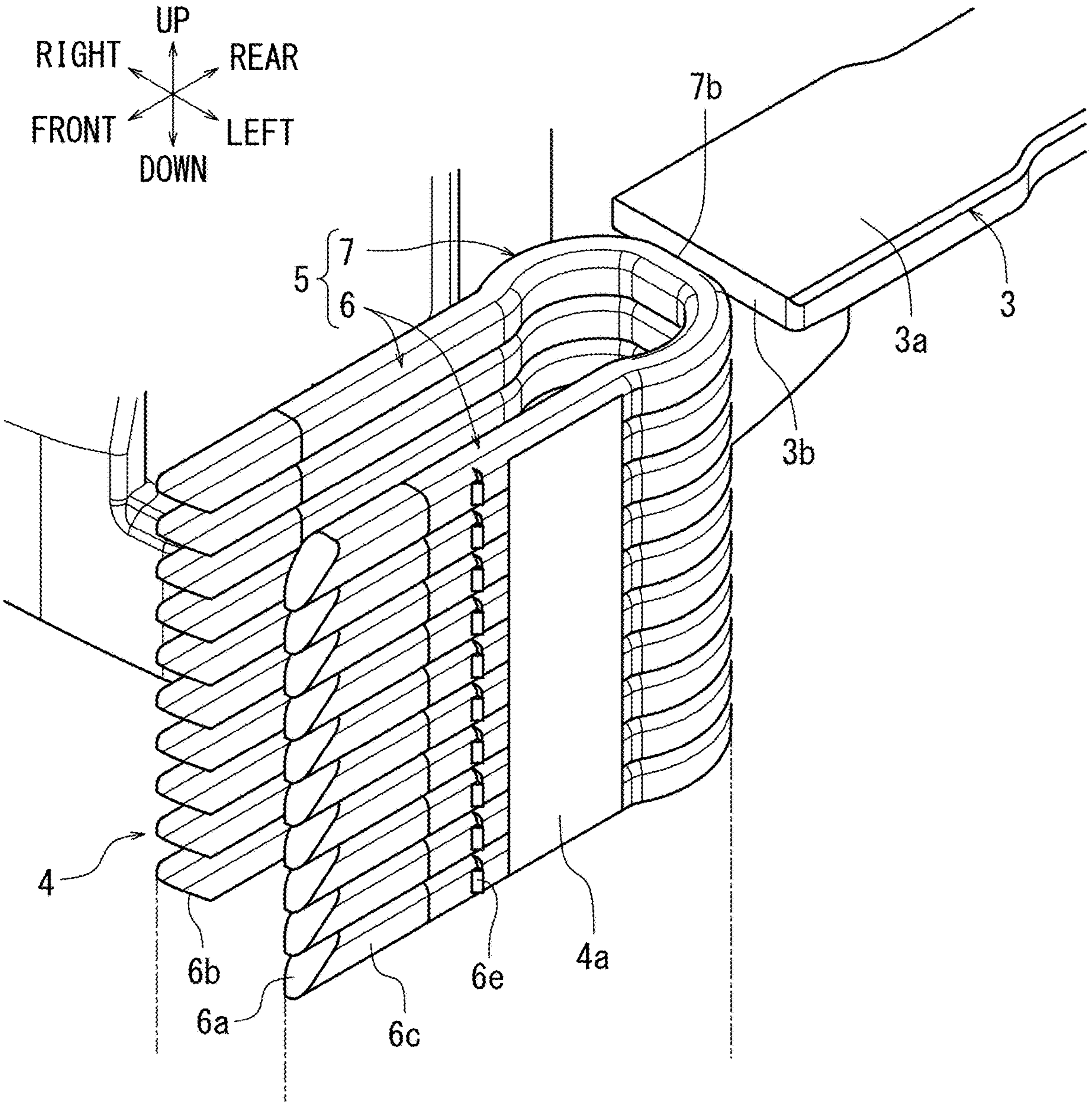
FIG. 3 is a perspective view of a driver and staples.

When the user pulls the trigger 13 in a state where the contact arm 19 is at the on position, the wheel 2*c* rotates in the direction indicated by the arrow R in FIG. 2. The last engaging pin 2*e* pushes the front-end rack 3*d* from the front in the rearward direction due to rotation of the wheel 2*c*. Because of this movement, the front-end rack 3*d* disengages from the last engaging pin 2*e*. As a result, the piston 1*c* moves forward due to the gas pressure in the accumulation chamber 1*d*. As the piston 1*c* moves forward, the driver 3 moves forward within the driving passage 1*f*. Accordingly, a tip end 3*a* of driver 3 drives a staple 5, as shown in FIG. 3. The driven staple 5 ejects from the ejection port 1*h* located at the front end of the driving nose 1*e* (refer to FIG. 1). The ejected staple 5 is driven into the workpiece W.

As shown in FIG. 2, when the piston 1*c* reaches a lower moving end, the piston 1*c* collides with the damper 1*i* to stop moving the piston 1*c* and the driver 3 in the forward direction. The damper 1*i* absorbs an impact of the piston 1*c* when the piston 1*c* collides with the damper 1*i*, thereby preventing the piston 1*c* from damaging. After the piston 1*c* stops moving forward, the wheel 2*c* continues to rotate in the rotation direction R of the wheel 2*c*. Because of this movement, the engaging portion 2*d* at the leading end in the rotation direction R of the wheel 2*c* engages the rearmost engaged portion 3*c* (rack 3*c*) from the front. As the wheel 2*c* continues to rotate, the engaging portion 2*d* sequentially pushes a corresponding engaged portion 3*c* in the rearward direction. In this manner, the lift mechanism 2*b* moves the driver 3 and the piston 1*c* to the standby position.

Figure 6:
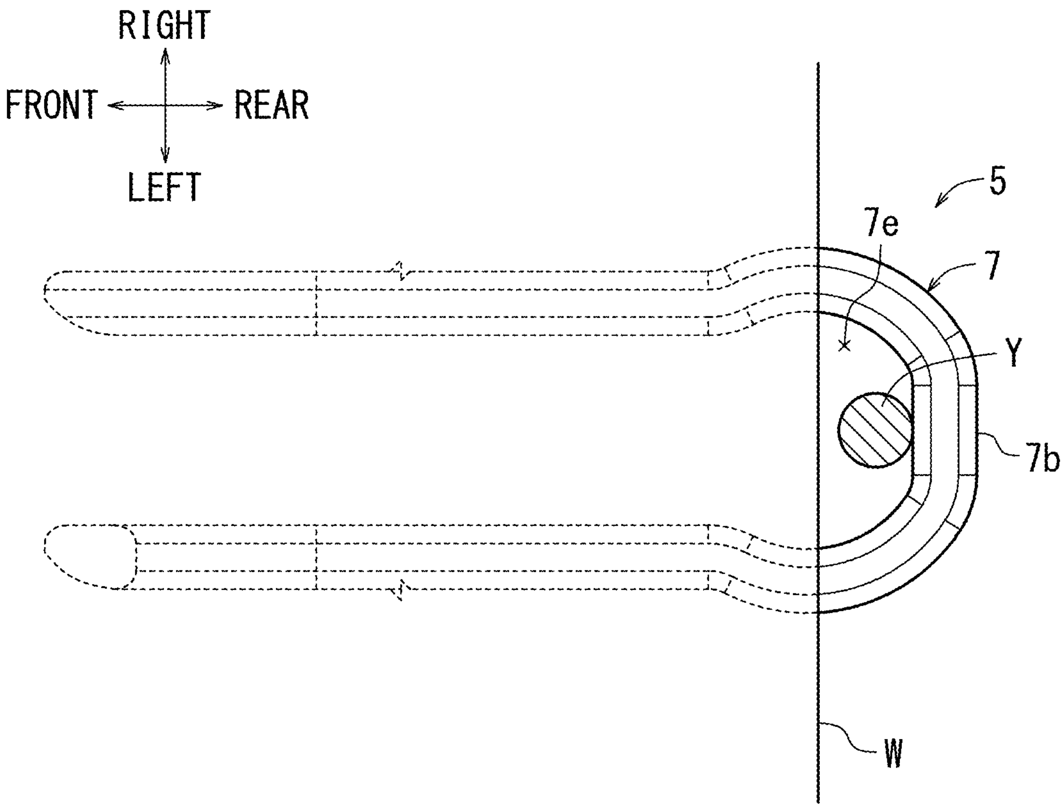
FIG. 6 is a schematic diagram showing a state where a staple of the first embodiment is driven into a workpiece.

The detailed configuration of the staple 5 of the first embodiment is described below. As shown in FIG. 6, the staple 5 is a fencing staple used to fasten a metal fence wire Y to a wooden post, which serves as the workpiece W. As shown in FIG. 3, the staples 5 are provided in the form of collated staples 4, in which a plurality of staples 5 are connected by a connecting part 4*a* such as, for example, a tape.

Figure 4:
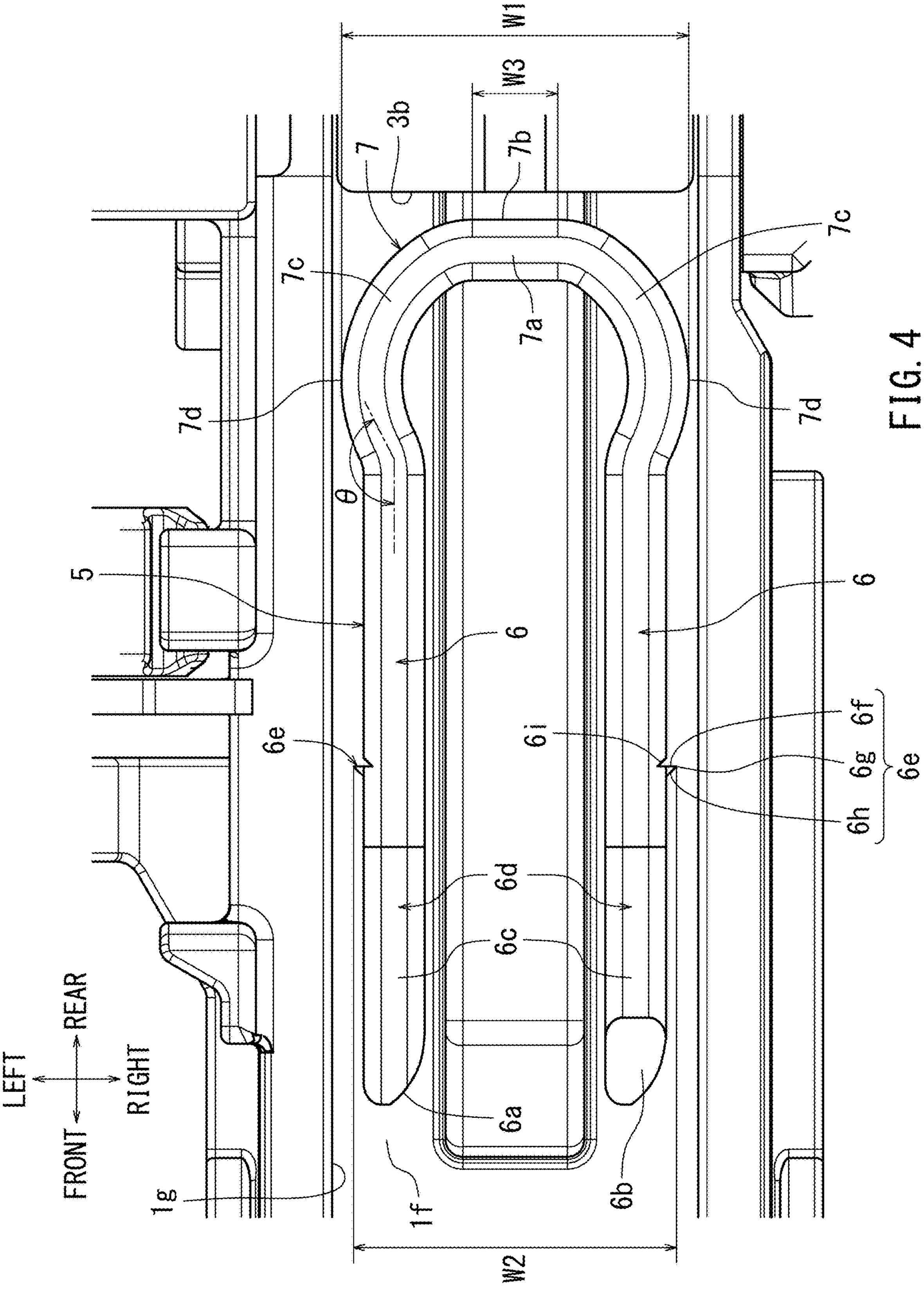
FIG. 4 is a bottom view of a staple supplied into a driving passage.
Figure 5:
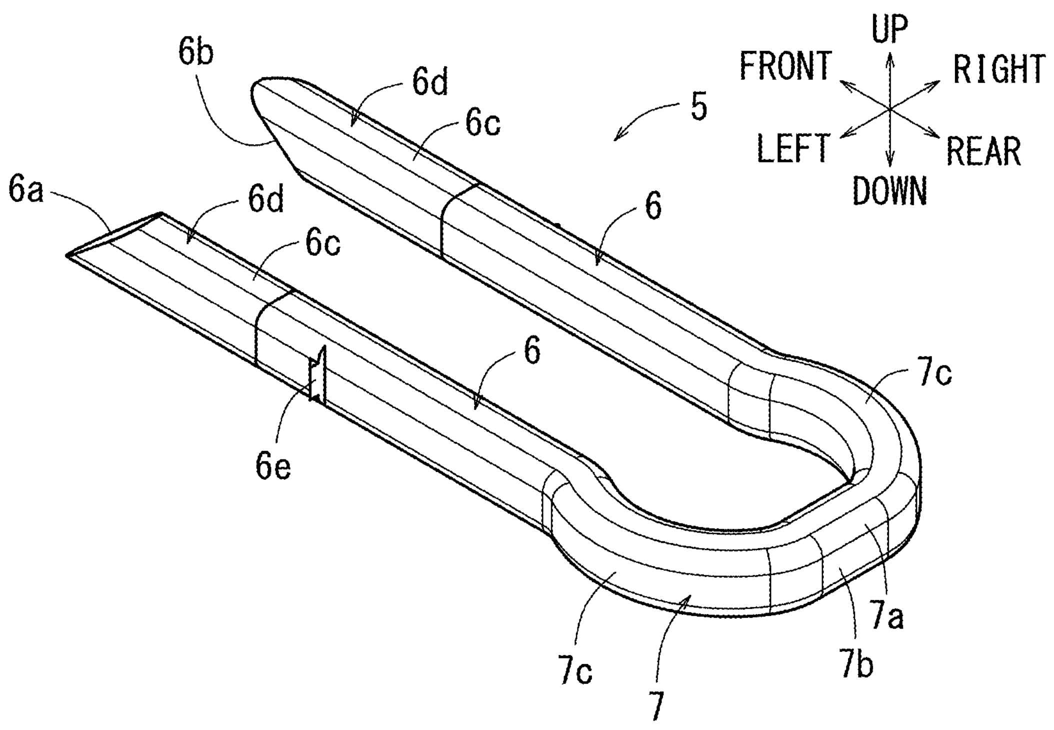
FIG. 5 is a perspective view of a staple according to a first embodiment of the present disclosure.

As shown in FIGS. 4 and 5, the staple 5 is approximately a U-shaped member formed by bending a metal wire. A cross-section of the staple 5 is in approximately a rectangular shape with rounded and beveled corners. The staple 5 is made from material with a thickness of, for example, 15 gauge. The staple 5 has a pair of legs 6 and a crown 7 connecting each leg 6.

As shown in FIG. 4 and FIG. 5, a pair of legs 6 are formed on both the left and right sides of staple 5, with each leg 6 extending from a corresponding end of the crown 7. The pair of legs 6 extend in the front-rear direction, remaining parallel to each other. Inclined surfaces 6*a* and 6*b* are formed at the tip of each leg 6, which are inclined with respect to the driving direction. Each of the inclined surfaces 6*a* and 6*b* is formed to be inclined in different directions. The left-side incline 6*a* faces forward and upward and the right-side incline 6*b* faces forward and downward. Because of this configuration, when the staple 5 is driven into the workpiece W, the left leg 6 is pushed downward and the right leg 6 is pushed upward. This causes the pair of legs 6 to extend alternately in the front-rear direction. Because of this, the driven staple 5 is difficult to remove from the workpiece W.

An adhesive 6*c* is applied to the tip end portion 6*d* of each leg 6. This adhesive 6*c* adheres the tip end portion 6*d* to the workpiece W. Accordingly, the driven staple 5 is more difficult to remove from the workpiece W.

As shown in FIGS. 4 and 5, each pair of legs 6 has a barb 6*e* (spike/prong) projecting outwardly in the left-right direction. Each barb 6*e* is formed in the middle of each leg 6 in the front-rear direction. Each barb 6*e* has a flat surface 6*f* perpendicular to the front-rear direction and a tapered surface 6*h* extending diagonally forward from a projection end 6*g*. The flat surface 6*f* engages the workpiece W from the front after the staple 5 is driven into the workpiece W. Because of this, the driven staple 5 becomes more difficult to remove from the workpiece W. A recess 6*i* is formed behind each barb 6*e*.

As shown in FIGS. 4 and 5, the crown 7 has a straight portion 7*a* extending in the left-right direction, and left and right curved portions 7*c* extending in an arc from each end of straight portion 7*a*, bulging outwardly in the left-right direction. The straight portion 7*a* has a top surface 7*b* that faces rearward. The top surface 7*b* forms a flat surface perpendicular to the front-rear direction (driving direction). Each curved portion 7*c* is connected to the rear end of each leg 6. An outer width W1 of the crown 7 is the width between the outside surfaces 7*d* that bulge outwardly on the left and right sides of each curved portion 7*c*. The outer width W1 is greater than the width W2 between the projection ends 6*g* of each barb 6*e*. The outer width W1 is the maximum width of the staple 5. In other words, the curved portions 7*c* form the maximum width portion of the staple 5.

As shown in FIG. 4, when the staple 5 is loaded into the driving passage 1*f*, each outside surface 7*d* is guided by a side wall portions 1*g* of the driving passage 1*f*. Each outside surface 7*d* has a curved surface shape that faces outwardly in the left-right direction. Each outside surface 7*d* is guided by the side wall portion 1*g* of the driving passage 1*f* in the front-rear direction. The curved portion 7*c* transmits a driving force of the driver 3 to the pair of legs 6 without causing stress concentration, preventing the staple 5 from being damaged by the driving force of the driver 3.

As shown in FIG. 4, the angle θ at which each curved portion 7*c* extends outwardly from each leg 6 in the left-right direction is set to be larger than 90 degrees. Accordingly, during driving the staple 5, the resistance of each curved portion 7*c* against the workpiece W can be relatively reduced. Because of this, the staple 5 can be efficiently driven into the workpiece W.

As shown in FIGS. 3 and 4, the driver 3 advances its thin plate-shaped tip end portion 3*a*, pushing the top surface 7*b* from behind. A driving surface 3*b* of the tip end portion 3*a* forms a square surface perpendicular to the front-rear direction (driving direction), creating surface-contacts with the top surface 7*b*. This configurations ensures that the staple 5 is driven evenly over a large area in the direction perpendicular to the driving direction (i.e., in the left-right and up-down directions), preventing it from tilting or misaligning when entering the workpiece W. As a result, the staple 5 is properly driven.

As shown in FIG. 4, the top surface 7*b* is centrally formed in the left-right direction of the staple 5. Accordingly, the driver 3 can drive the center of the staple 5 in the left-right direction. Because of this, a driving force is applied evenly to the pair of legs 6 in the left-right direction, allowing the pair of legs 6 to be driven evenly against the workpiece W. The left-right width W3 of the top surface 7*b* is about one-fourths of the outer width W1 of the crown 7. The predetermined width of the top surface 7*b* allows for proper surface contact with the driving surface 3*b* of the driver 3.

As shown in FIG. 6, the wire Y to be fastened to the workpiece W can be easily positioned in the middle of the staple 5 in the left-right direction. This prevents the staple 5 from tilting. Moreover, by forming the top surface 7*b* having the left-right width W3 smaller than the outer width W1 of the staple 5, the space 7*e* between the crown 7 of the driven staple 5 and the workpiece W can be made relatively narrow. Because of this, a movable range of the wire Y relative to the staple 5 can be narrowed, thereby firmly fixing the wire Y.

As shown in FIG. 4, the staple 5 features a crown 7 connecting the base ends of the pair of parallel legs 6. The crown 7 has a width that is greater than the distance between the pair of legs 6, and its flat top surface 7*b* is plane shaped, facing away from the legs 6. This ensures the staple 5 driven by the driver 3 of the driving tool 10 makes a surface-contact with the top surface 7*b* of the crown 7. In another words, the staple 5 is more likely to be driven flatly by the driver 3 of the driving tool 10 when it receives an impact on the top surface 7*b*. Accordingly, the staple 5 receives a more even and uniform driving force across its width, ensuring the staple 5 less prone to tilting or misalignment misaligned when driven into the workpiece W.

Still in FIG. 4, the staple 5 has the legs 6 with the barbs 6*e* that protrude in opposite directions, which boost the staple's pull-out load from the workpiece W. That is, each of the pair of legs 6 forms a barb 6*e* that protrudes outwardly, such that each barb 6*e* protrudes away from the other. The crown 7 protrudes outwardly beyond the barbs 6*e* in the width direction. Therefore, the barbs 6*e* increase a pull-out load of the staple 5 against the workpiece W. The crown 7 protrudes outwardly beyond the barbs 6*e* in the width direction, and accordingly, the crown 7 is easily guided by the driving passage 1*f* in the width direction. Also, the barb 6*e* is less likely to contact the driving passage 1*f*. Furthermore, the crown 7 is restricted from displacing in the width direction in an area relatively close to the top surface 7*b* that is driven by the driver 3. The crown 7 is wider than the barbs 6*e*, simplifying its guidance of the staple 5 through the driving passage 1*f* and displacement in the width direction. In another words, the staple 5 is easily guided by the driving passage 1*f* and is not easily displaced in the width direction.

As shown in FIG. 4, the top surface 7*b* is formed in the middle of the crown 7 in the width direction. The width of the top surface 7*b* is between one-sixth and two-thirds of the maximum width of the crown 7. Thus, the middle portion of the staple 5 in the width direction is driven by the driver 3. Accordingly, a driving force is uniformly applied to the pair of legs 6 in the width direction. Furthermore, the top surface 7*b* has a certain width and length. Therefore, the staple 5 is easily driven into the workpiece W without tilting.

As shown in FIG. 4, the crown 7 has the curved portion 7*c* extending from the top surface 7*b* and bulging in the width direction. The curved portion 7*c* extends to the maximum width portion. Therefore, the driving force received by the top surface 7*b* is likely transmitted to the maximum width portion without causing stress concentration, due to the curved portion 7*c*. Because of this, the staple 5 is less likely to be damaged.

As shown in FIG. 4, an adhesive 6*c* is applied to a pair of legs 6 to increase the resistance when being removed from the workpiece W. Therefore, the driven staple 5 is more difficult to remove from the workpiece W.

For example, the staple 5 has a thickness of 15 gauge or greater. Thus, as shown in FIG. 6, the staple 5 can be easily used as a fencing staple to fasten a metal wire Y between the staple 5 and the workpiece W.

As shown in FIG. 3, the staple 5 is provided in the form of collated staples 4 with a plurality of staples 5 connected together. Therefore, the staple 5 can be easily handled as the collated staples 4.

As shown in FIG. 4, the driving tool 10 drives the staple 5. The driver 3 of the driving tool 10 has the driving surface 3*b* that is perpendicular to the driving direction so as to surface-contact the top surface 7*b* of the staple 5. Therefore, the top surface 7*b* of the staple 5 is driven by the driving surface 3*b* of the driver 3. The driver 3 drives the staple 5 uniformly in the width direction due to the surface-contact between the driving surface 3*b* of the driver 3 and the top surface 7*b* of the staple 5. Thus, the staple 5 is prevented from tilting when driven into the workpiece W.

In the following, other embodiments of this disclosure will be described below. In the following explanation, descriptions of the members and configurations in common with the first embodiment may be omitted by using the same reference numerals.

Figure 7:
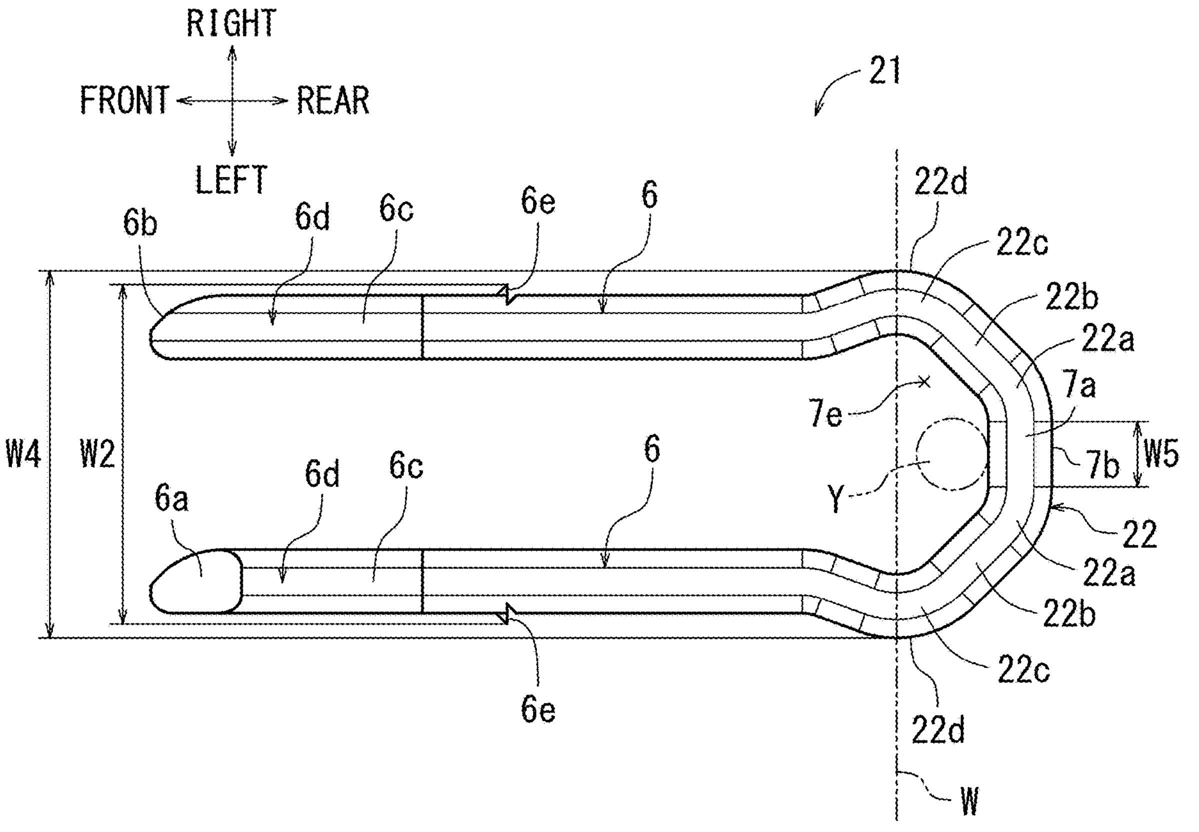
FIG. 7 is a bottom view of a staple according to a second embodiment of the present disclosure.
Figure 8:
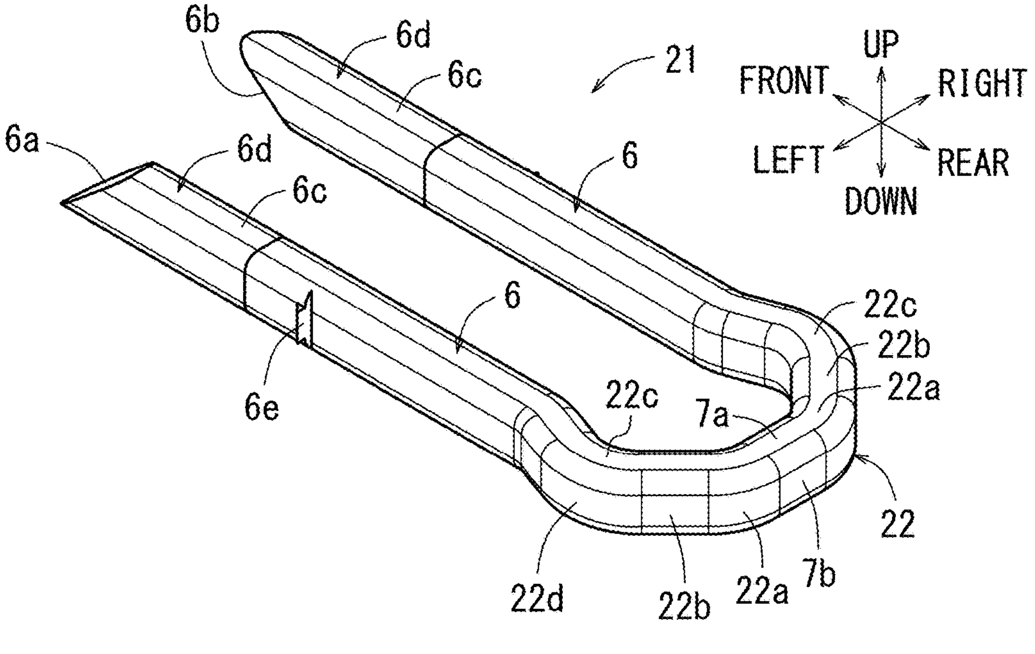
FIG. 8 is a perspective view of the staple shown in FIG. 7.

As shown in FIGS. 7 and 8, a staple 21 in the second embodiment has a crown 22 that connects a pair of legs 6. The crown 22 has a straight portion 7*a* and left and right first curved portions 22*a* extending in an arc from the corresponding ends of the straight portion 7*a*, bulging outwardly in the left-right direction. Outer ends of the left and right first curved portions 22*a* are respectively connected to left and right diagonal portions 22*b* that extend linearly forward at an angle. Each diagonal portion 22*b* extends outwardly in the left-right direction. Left and right second curved portions 22*c* extending in an arc from the corresponding outer ends of the diagonal portion 22*b* are formed, bulging outwardly in the left-right direction. Each second curved portions 22*c* is connected to the corresponding rear ends of the pair of legs 6.

An outer width W4 of crown 22 is a width between the outside surfaces 22*d* of the second curved portions 22*c* bulging outwardly in the left-right direction. The outer width W4 is greater than the width W2 between each barb 6*e*. The outer width W4 is the maximum width of the staple 21. In other words, the second curved portions 22*c* form the maximum width portion of the staple 21.

When the staple 21 is loaded into the driving passage 1*f*, each outer surface 22*d* is guided by the side wall portions 1*g* of the driving passage 1*f* (refer to FIG. 4). Each outside surface 22*d* has a curved surface shape that faces outwardly in the left-right direction. Each outside surface 22*d* is guided by the side wall portion 1*g* of the driving passage 1*f* in the front-rear direction. The width W5 of the top surface 7*b* is about one-sixth of the outer width W4 of the crown 22.

The first curved portions 22*a* transmit the driving force of the driver 3 to the diagonal portions 22*b* without causing stress concentration. The second curved portions 22*c* transmit the driving force of the driver 3 to the pair of legs 6 without causing stress concentration, preventing the staple 21 from being damaged by the driving force of the driver 3.

Due to the diagonal portion 22*b*, the space 7*e* between the driven crown 22 and the workpiece W can be relatively narrow. Because of this configuration, a movable range of the wire Y relative to the staple 22 can be narrowed, thereby firmly fixing the wire Y.

As shown above in FIG. 7, the crown 22 has the first curved portions 22*a* extending from the top surface 7*b* and bulging in the width direction. The diagonal portions 22*b* extend straight from the first curved portions 22*a* to the maximum width portion. Therefore, the driving force received by the top surface 7*b* is likely transmitted to the diagonal portions 22*b* without causing stress concentration, due to the first curved portion 22*a*. Because of this, the staple 21 is less likely to be damaged.

Figure 9:
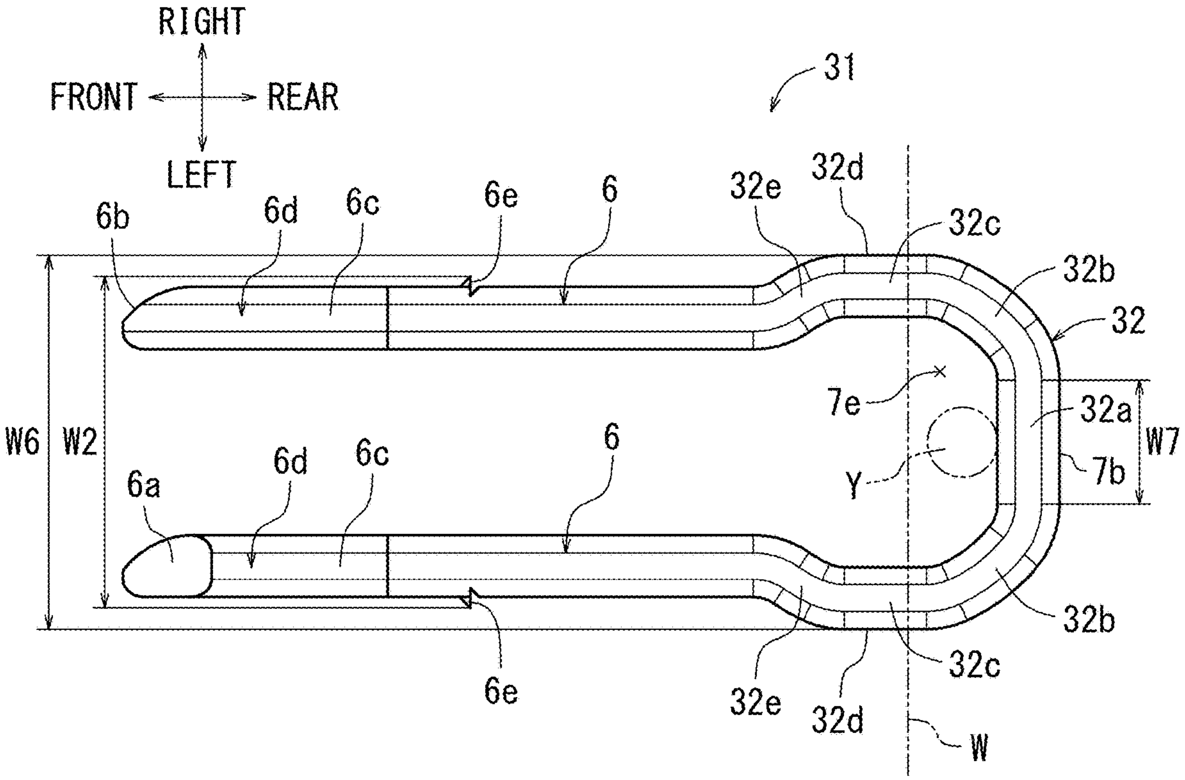
FIG. 9 is a bottom view of a staple according to a third embodiment of the present disclosure.
Figure 10:
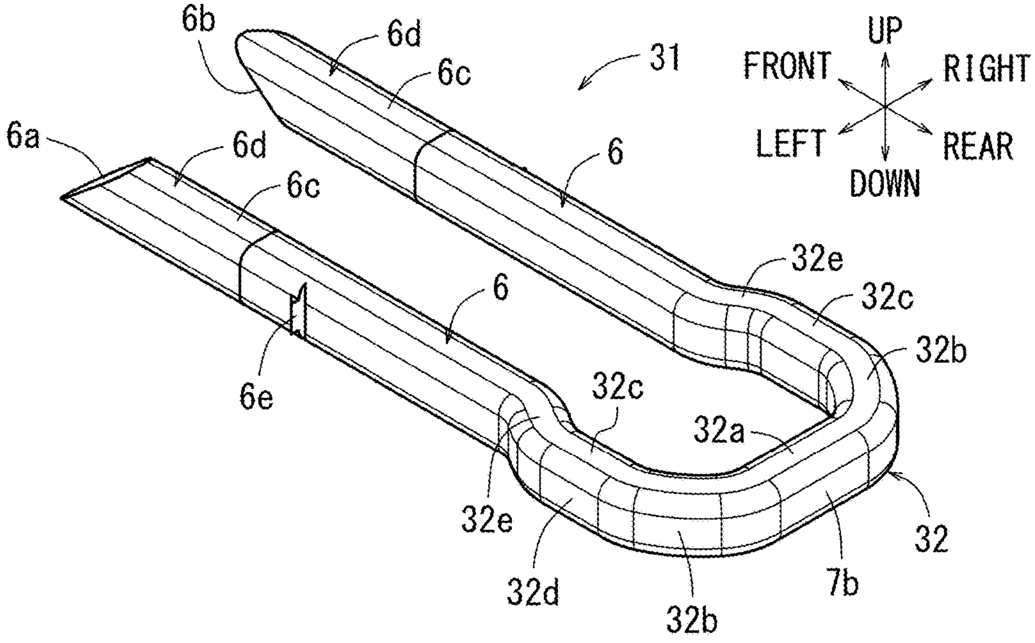
FIG. 10 is a perspective view of the staple shown in FIG. 9.

As shown in FIGS. 9 and 10, a staple 31 in the third embodiment has a crown 32 that connects the pair of legs 6. The crown 32 has a first straight portion 32*a* extending straight in the left-right direction, and left and right first curved portions 32*b* extending in an arc from the first straight portion 32*a* bulging outwardly in the left-right direction. Left and right second straight portions 32*c* extend directly forward from the corresponding front ends of the left and right first curved portions 32*b*. Furthermore, a left and right second curved portions 32*e* extend arcuately inward in the left-right direction from the corresponding front end of the left and right second straight portions 32*c*. The left and right second curved portions 32*e* are connected to the corresponding rear ends of the pair of legs 6.

Each left and right second straight portion 32*c* has a guide surface 32*d* that faces outwardly in the left-right direction. Each guide surface 32*d* extends in a direction in which the pair of legs 6 extends. Each guide surface 32*d* has a flat surface perpendicular to the left-right direction. An outer width W6 of the crown 32 is a width between each guide surface 32*d*. The outer width W6 is greater than the width W2 between each barb 6*e*. The outer width W6 is the maximum width of the staple 31. In other words, each second straight portion 32*c* forms the maximum width of the staple 31.

When the staple 31 is loaded into the driving passage 1*f*, each guide surface 32*d* is guided by the side wall portion 1*g* of the driving passage 1*f* (refer to FIG. 4). Each guide surface 32*d* is guided by the side wall portion 1*g* along the flat surface of each guide surface 32*d*. Accordingly, the staple 31 is guided over a large area on both sides along the driving passage 1*f*, thereby preventing the staple 31 from tilting. The width W7 of the top surface 7*b* is about one-thirds or two-thirds of the outer width W6 of the crown 32.

The first curved portions 32*b* transmits the driving force of the driver 3 to the second straight portions 32*c* without causing stress concentration. The second curved portions 32*e* transmit the driving force of the driver 3 to the pair of legs 6 without causing stress concentration, preventing the staple 31 from being damaged by the driving force of the driver 3.

As shown above in FIG. 9, the crown 32 has the guide surfaces 32*d* formed in a flat shape, facing outwardly in the width direction at the maximum width of the staple 31. The guide surfaces 32*d* extend in the same direction as the legs 6. Thus, the guide surface 32*d* faces against the driving passage 1*f*. Therefore, the staple 31 is guided over a large area by the guide surface 32*d*. Accordingly, the staple 31 is less likely to tilt when driven into the workpiece W.

Figure 11:
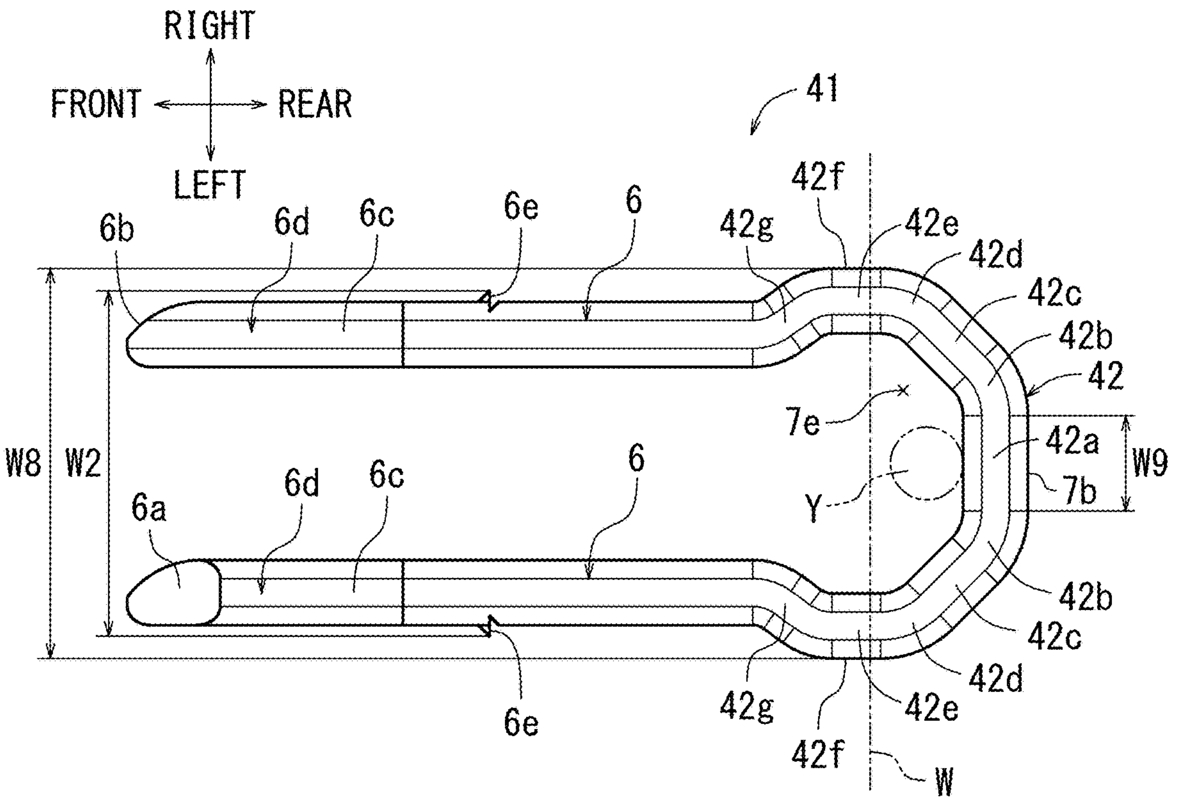
FIG. 11 is a bottom view of a staple according to a fourth embodiment of the present disclosure.
Figure 12:
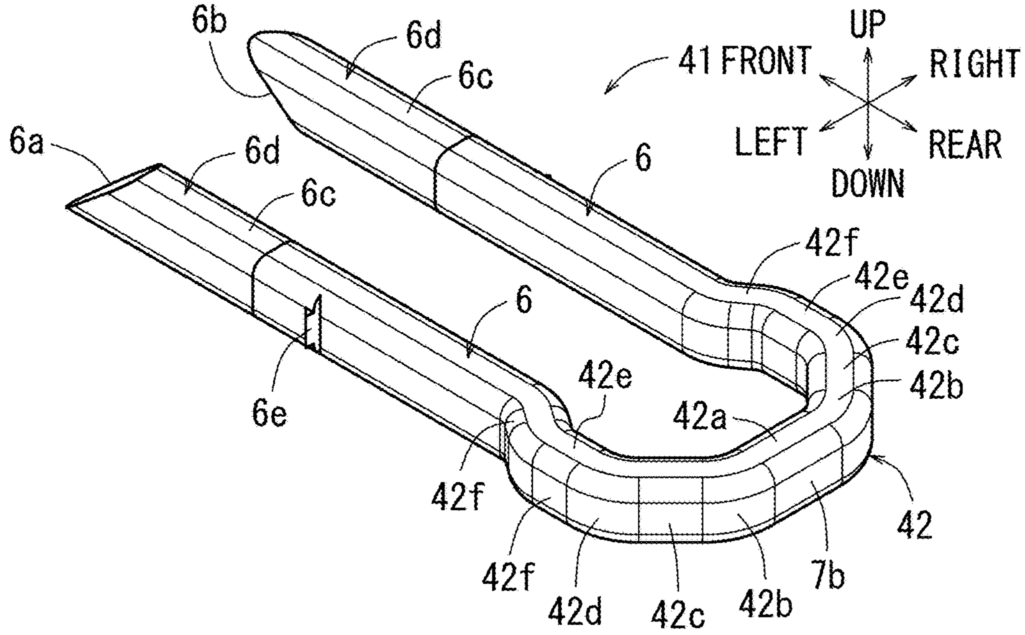
FIG. 12 is a perspective view of the staple shown in FIG. 11.

As shown in FIGS. 11 and 12, a staple 41 in the fourth embodiment has a crown 42 that connects a pair of legs 6. The crown 42 has a first straight portion 42*a* extending straight in the left-right direction, and left and right first curved portions 42*b* extending in an arc from the corresponding ends of the first straight portion 42*a*, bulging outwardly in the left-right direction. Left and right diagonal portions 42*c* extend straight diagonally from the corresponding outer ends of the left and right first curved portions 42*b*. Each left and right diagonal portion 42*c* extends outwardly in the left-right direction. Left and right second curved portions 42*d* formed in an arc shape extend from the corresponding ends of the left and right diagonal portions 42*c*, bulging outwardly in the left-right direction. Left and right second straight portions 42*e* extend forward from the corresponding front ends of the left and right second curved portions 42*d*. Left and right third curved portions 42*g* are formed in an arc shape, extending inwardly from the corresponding front ends of the left and right second straight portions 42*e*. The left and right third curved portions 42*g* are connected to the rear ends of the pair of legs 6, respectively.

Each left and right second straight portion 42*e* has a guide surface 42*f* that faces outwardly in the left-right direction. Each guide surface 42*f* extends in a direction in which the pair of legs 6 extends. Each guide surface 42*f* has a flat surface perpendicular to the left-right direction. An outer width W8 of the crown 42 is a width between each guide surface 42*f*. The outer width W8 is greater than the width W2 between each barb 6*e*. The outer width W8 is the maximum width of the staple 41. In other words, each second straight portion 42*e* forms the maximum width of the staple 41.

When the staple 41 is loaded into the driving passage 1*f*, each guide surface 42*f* is guided by the side wall portion 1*g* of the driving passage 1*f* (refer to FIG. 4). Each guide surface 42*f* is guided by the side wall portion 1*g* along the flat surface of each guide surface 42*f*. Accordingly, the staples 41 are guided over a large area on both sides along the driving passage 1*f*, thereby preventing the staple 41 from tilting. The width W9 of the top surface 7*b* is about one-thirds or two-thirds of the outer width W8 of the crown 42.

The first curved portion 42*b* transmits the driving force of the driver 3 to the diagonal portion 42*c* without causing stress concentration. The second curved portion 42*d* transmits the driving force of the driver 3 to the second straight portion 42*e* without causing stress concentration. The third curved portion 42*g* transmits the driving force of the driver 3 to the pair of legs 6 without causing stress concentration. Because of this, the staples 41 is prevented from being damaged by the driving force of the driver 3.

Due to the diagonal portion 42*c*, the space 7*e* between the driven crown 42 and the workpiece W can be made relatively narrow. Because of this configuration, a movable range of the wire Y relative to the staple 22 can be narrowed, thereby firmly fixing the wire Y.

Various modifications can be made to each of the embodiments described above. In the above embodiments, the driving tool is a gas spring type driving tool. Instead, the present disclosure may be applied to a driving tool that is referred to as a mechanical spring type driving tool, in which, the driver is moved in the opposite direction of the driving direction by a lift mechanism to increase a spring force, such as a mechanical compression spring, for moving the driver in the driving direction.

The cross-sectional shape of the staple may be triangular, pentagonal with five or more sides, or circular. The staple has a thickness of more than 15 gauge. The collated staples may be configured to be adhesive-connected. The staples may be without barbs.

The driver may have an extended portion that extends forward of the driving surface. The extending portion can be used, for example, as a support portion to prevent the driver from tilting in the left-right direction.

We claim:

1. A staple comprising:

a pair of legs extending approximately parallel to each other in a longitudinal direction;

a crown connected to base ends of the pair of legs, the crown defining a width greater than a separation distance between the pair of legs in a width direction; and a planar top surface defined on the crown, the planar top surface positioned to face away from the pair of legs and centrally located on the crown in the width direction, wherein:

each tip of the pair of legs has an inclined surface that is inclined with respect to the longitudinal direction, the inclined surface of one leg of the pair of legs facing in a first lateral direction, and the inclined surface of the other leg of the pair of legs facing in a second lateral direction opposite to the first lateral direction, such that when the staple is driven into a workpiece, the pair of legs extend in opposite lateral directions relative to the longitudinal direction, the planar top surface has a width that is less than the separation distance between the pair of legs in the width direction, the width being within a range from one-sixth to two-thirds of a maximum width of the crown, and the crown includes a curved portion extending from the planar ton surface and outwardly bulging in the width direction, and a diagonal portion extending linearly from the curved portion toward a region of a maximum width portion of the crown.

2. The staple according to claim 1, wherein, each of the pair of legs comprises a barb that protrudes outwardly and away from each other, and the crown protrudes outwardly beyond the barbs in the width direction.

3. The staple according to claim 1, wherein the crown includes a planar guide surface positioned in the region of the maximum width portion of the crown to face outwardly in the width direction, the planar guide surface extending in a direction in which the pair of legs extends.

4. The staple according to claim 1, further comprising an adhesive coating applied to at least a portion of the pair of legs to increase resistance to remove the staple from a workpiece.

5. The staple according to claim 1, wherein the staple has a material gauge of 15 gauge or greater.

6. The staple according to claim 1, wherein the staple is provided as part of a collated assembly of multiple staples.

7. A driving tool for driving the staple according to claim 1, wherein the driving tool includes a driver having a driving surface oriented substantially perpendicular to a driving direction and configured to surface-connect the planar top surface of the staple.

8. The staple according to claim 1, wherein the crown further includes a second curved portion, the second curved portion forming the maximum width portion of the crown.

9. The staple according to claim 1, wherein the crown further includes a straight portion, the straight portion forming the maximum width portion of the crown.

10. A staple comprising:

a pair of legs extending approximately parallel to each other in a longitudinal direction;

a crown connected to base ends of the pair of legs, the crown defining a width greater than a separation distance between the pair of legs; and a planar top surface defined on the crown forming a first linear portion and oriented away from the pair of legs, the planar top surface centrally located on the crown in a width direction, wherein:

the crown further includes a first curved portion extending from the planar top surface and bulging in a width direction, and a second linear portion that defines a widest part of the crown, each tip of the pair of legs has an inclined surface that is inclined with respect to the longitudinal direction, the inclined surface of one leg of the pair of legs facing in a first lateral direction, and the inclined surface of the other leg of the pair of legs facing in a second lateral direction opposite to the first lateral direction, such that when the staple is driven into a workpiece, the pair of legs extend laterally with respect to the longitudinal direction, and the planar top surface has a width that is less than the separation distance between the pair of legs in the width direction, and the crown further includes a diagonal portion extending linearly from the first curved portion and a second curved portion that connects the diagonal portion and the second linear portion.

11. The staple according to claim 10, wherein the second linear portion includes a planar guide surface that faces outwardly in the width direction and extends in a direction in which the pair of legs extends.

12. The staple according to claim 10, wherein each of the pair of legs comprises a barb that protrudes outwardly and away from each other, the barb being centrally located on each of the pair of legs in a front-rear direction, and the crown protrudes outwardly beyond the barbs.

13. A driving tool for driving the staple according to claim 10, wherein the driving tool includes a driver having a driving surface oriented perpendicular to a driving direction and configured to surface-connect the planar top surface of the staple.

* * * * *